United States Patent
Giermek et al.

(10) Patent No.: US 6,733,297 B1
(45) Date of Patent: May 11, 2004

(54) INSTRUCTIONAL DEVICE

(76) Inventors: Adam Giermek, 1925 W. 20th St., #102, Los Angeles, CA (US) 90018; Mark G. Valentine, 22122 S. Vermont Av., Unit A, Torrance, CA (US) 90502

( * ) Notice: Subject to any disclaimer, the term of this patent is extended or adjusted under 35 U.S.C. 154(b) by 0 days.

(21) Appl. No.: 10/351,164

(22) Filed: Jan. 24, 2003

(51) Int. Cl.[7] .................................................. G09B 3/00
(52) U.S. Cl. ..................................... 434/327; 434/322
(58) Field of Search ................................ 434/322, 327, 434/329, 333, 334, 343, 346

(56) References Cited

U.S. PATENT DOCUMENTS

| | | | | |
|---|---|---|---|---|
| 2,311,217 A | * | 2/1943 | Emmert | 434/327 |
| 2,509,405 A | * | 5/1950 | Zimmerman | 434/353 |
| 2,585,099 A | * | 2/1952 | Emmert | 434/327 |
| 2,866,275 A | * | 12/1958 | Reynolds | 434/327 |
| 3,763,576 A | * | 10/1973 | Sulkin | 434/322 |
| 4,049,265 A | * | 9/1977 | Mackie | 273/430 |
| 4,182,052 A | * | 1/1980 | Liu et al. | 434/330 |

* cited by examiner

Primary Examiner—Kurt Fernstrom

(74) Attorney, Agent, or Firm—Maria Erlinda Co Sarno

(57) ABSTRACT

This invention relates to an instructional device comprising a casing snugly enclosing a first central insert component and a second insert component. Each insert component has a combination of protruding fences, walled openings, and plain openings on a top and bottom surfaces. The first central insert component and the second central insert component is stacked together with the bottom surfaces of each central insert component communicating directly with each other resulting in the top surface of the first central insert component facing away from the top surface of the second central insert component. The stacking of the bottom surfaces with each other forms a series of internal enclosures and pathways while each top surface of the central insert components forms a series of external enclosures and pathways. The coordination of the internal and external enclosures and pathways forms several pathways permitting passage of an object from one top surface to the other top surface or through a middle compartment formed after stacking the first with the second central insert compartment. The object is the tool used to operate the device. A series of questions and answers are imprinted on each face and each pair of question and answer is contained in a cell. Correct and incorrect answers are given. The object is used to designate which answer is chosen by the user. Each answer has an opening leading to a definite pathway. All correct answers lead the object to the finish point while. incorrect answers make a user repeat or restart the operation.

21 Claims, 11 Drawing Sheets

INSTRUCTIONAL DEVICE

BACKGROUND

This invention relates to an instructional device that assists a person in remembering facts in any field that can be answered by a single or few letters, a word or a number or group of numbers.

In the present age of computers and calculators, a person especially students, most often get into their calculators or computers to get a quick answer. While this allows work to be accomplished at a faster rate, it has its disadvantages especially with children at their primary to high school level of education because they tend to rely on these modern devices for the answers without personally knowing them. Consequently, they are at a loss when computers or calculators are not handy when they need them or they don't have the ability to check whether the answers given by the devices are correct. Further, these calculators and computers foster laziness both mentally and physically and discourages one to patiently memorize or work their way into the right answers.

A mathematic teaching device disclosed in U.S. Pat. No. 5,759,041 attempts to address the above problem by offering a device where a mathematical question, specifically, a multiplication problem is posted at the front side and the right answer to the question is posted at the back side, the question and answer coordinated by a pointed instrument of sufficient length such as a pencil which passes from a hole bored at the front side posting the problem to the corresponding hole on the back side where the correct answer is posted. While this device aids a person wanting to memorize his/her multiplication table, the person is not given a challenge prior to answering the question before flipping over to the back side to see if the answer is correct. Also, the answer to the question at the back side is directly opposite in position to the question at the front side which makes it very easy for someone to quickly flip the device and look at the answers. Further, there are numerous facts covered by various fields aside from mathematical questions that one needs to know by heart such as historical, current, scientific, cultural, literary and geographical questions, the answers for which are good and beneficial to know which are not addressed by the above patented device.

It is therefore an object of this invention to provide an instructional device that will aid a person in memorizing facts and information on various topics.

It is also an object of this invention to provide a mental and physical challenge to the user of this device before an answer is given.

It is a further object of this invention to provide the device in a form that can be used by every member of the community.

It is still a further object of this invention to provide this device in a portable form so that it can be easily brought or transported, as well as carried along while travelling by any means of transportation.

It is also a further object of this invention to provide a gift item that is reasonable in price and at the same time very useful.

It is still a further object of this invention to provide an instructional device that improves ones manual dexterity while using the device.

It is also a further object of this invention to provide a feeling of satisfaction and pride on a user when the final step in the operation of the device is successfully reached.

SUMMARY OF THE INVENTION

This invention relates to an instructional device comprising a casing bordered by side walls, a front face and a back face, the casing snugly enclosing a first central insert component and a second central insert component, each having a combination of protruding fences, walled openings, and plain openings on a top and bottom surfaces. Herein, the first central insert component and the second central insert component may be simply referred to interchangeably as first and second insert or first and second insert component. The first central insert component and the second central insert component is stacked together with the bottom surfaces of each central insert component communicating directly with each other resulting in the top surface of the first central insert component facing away from the top surface of the second central insert component. The stacking of the bottom surfaces with each other forms a series of internal enclosures and pathways while each top surface of the central insert components forms a series of external enclosures and pathways. The coordination of the internal and external enclosures and pathways resulting from the communication and matching of the protruding fences, walled openings and plain openings forms several pathways permitting passage of an object from one top surface to the other top surface or through a middle compartment formed after stacking the first with the second central insert compartment. The object, preferably round such as a ball or a marble is the tool used to operate the device. The fences protrude upwards from the top surface and downwards from the bottom surface of the first and second central insert components. The tips of the fences that define the cells and separate the different areas of the device, protruding upwards from each top surface of the first and second central insert component, touch on the respective face of the casing or the device to prevent the object from leaving or entering the cells and the areas within the device through routes different from the designed pathways formed by the stacking of the first and second central insert components. This also allows turning the device upside down without affecting its operation. The central insert components stack in a definite manner to form the pathways and protruding bars from one insert component lodging against a designated wall or into specific openings of the other insert component further aid at ensuring that the components are stacked together properly. After the central insert components are stacked together, three of the side edges of the components are coterminal to each other while one edge of one central insert component extends further than the other edge of the other central insert component. This exposes the top and bottom surface of the extended section because it does not stack with a corresponding section of the other insert component. The extended section of the component have a series of openings designed for resetting the operation or entering a column area. Also the cells defined by the fences of one insert component does not lie directly opposite the cells defined by the fences of the other insert component but are offset from each other to allow the object to traverse from one top surface of an insert component to the other top surface of the other insert component in a sinuous pattern.

A series of questions and answers are imprinted on each face and each pair of question and answer is contained in a cell. The cells of question and answers are arranged in a column. The device provides two possible answers for each question, a correct answer and an incorrect or wrong answer. The object is used to designate which answer is chosen by the user. Each answer has an opening leading to a definite pathway. The answer is chosen by directing the object to one opening of a double opening sitting directly underneath the answers. The double opening leads to passageways of different depths, the depth underneath a correct answer is longer than the depth underneath a wrong answer because this passageway has to reach from one cell at the top surface of one insert component to the other cell at the top surface of the other insert component. The passageway for the wrong answer is shorter and terminates at the middle compartment formed between the first and second central insert component. The middle compartment leads to a wrong answer exit without reaching another cell. Longitudinal fences protruding from the bottom surface of one central insert component keep the object within the column of cells as it traverse the middle compartment to the wrong answer exit. The entry to an opening permitting the passage of the object preferably has a ramp to facilitate the entry but require slight tilting and maneuvering of the object before entering to prevent inadvertent entry. To prevent entry of the object at openings not designated for entry, the holes or openings are surrounded by protruding walls. Aside from the imprinted questions and answers, arrows directing the possible pathways for the object are also printed on the front and back faces of the casing or the device.

The device is preferably made of a plastic material with the front and back face of the casing transparent to be able to see the openings and pathways and direct the object to these openings and pathways. Sections of the front and back face covered by imprinted graphics should still allow a user to see the openings and pathways.

The device can be sectioned into different levels of complexity or the device can be just one continuous section. A nonabrasive material fully enveloping the side walls or edges of the device or partially enveloping the corners or other sharp edges of the device may be used to ensure safety in handling the device. Further, the device can have handles for a user to grip on while operating the device.

The different openings, enclosures and pathways provide the means for starting and resetting the device, for directing the object to a reset area when an incorrect answer is chosen or to another cell or the finish area when a correct answer is chosen, for repeating the operation of a column of cells of question and answers without restarting the operation and for ensuring the correct stacking of the first central insert component with the second central insert component.

A method for operating the device described above comprising a series of questions and answers having an opening and corresponding pathways for each answer, individual pathways for starting, resetting, repeating and ending the operation, each pathway formed by a combination of protruding fences, walled openings and plain openings on a top and bottom surface of a first and second central insert components stacked in a definite position and enclosed in a casing, the pathways permitting passage of an object therethrough, comprise the steps of:

a. starting an operation by placing an object at a reset area and allowing the object to enter a start hole, the start hole directing the object to an entry area;

b. directing the object to enter a hole leading to a cell having a pair of question and answers;

c. answering the question by choosing between a correct answer and a wrong answer and directing the object to a hole directly underneath the chosen answer, each answer leading the object to a definite pathway;

d. proceeding to another cell if the correct answer is chosen, the object lodging at the other cell;

e. repeating step (d) to an end of a column of cells or proceeding to another column of cells to an end of the operation if all the answers chosen are correct;

f. restarting the operation of a completed column, the object directed to a column reset hole;

g. restarting the operation at the end of the operation, the object directed to the start hole of the reset area;

h. restarting a new operation or the column of cells when a wrong answer is chosen, the object exiting to a wrong answer area and proceeding to a reset hole to start the new operation or to a column entry area to repeat the same column of cells where the wrong answer was chosen, and, i. quitting at any step of the operation.

When a correct answer is chosen, proceeding to another cell is done by flipping the device because the object proceeds from one cell located at the top surface of one central insert component to another cell at the top surface of the other central insert component.

The object can be made to enter a reset area to restart the operation or repeat the operation of the same column of cells at any time by purposely choosing a wrong answer. However, the option of repeating a successfully completed column, that is choosing all correct answers, is allowed only at the end of certain columns of cells.

DETAILED DESCRIPTION OF THE INVENTION

The invention relates to an instructional device that assists a user in remembering facts on various fields which can be condensed into a simple question and answer format, the answer preferably indicated by a few letters, a word, a number or group of numbers.

To specifically show the difference of this invention from that disclosed by Batten in U.S. Pat. No. 5,759,041, the example used herein also applies the device on multiplication problems. However, as stated above, the claimed invention applies equally well in assisting one not only on mathematics but also on various fields such as history, current events, science, culture, government, law, literature, geography and others.

Figures 1, 1A:
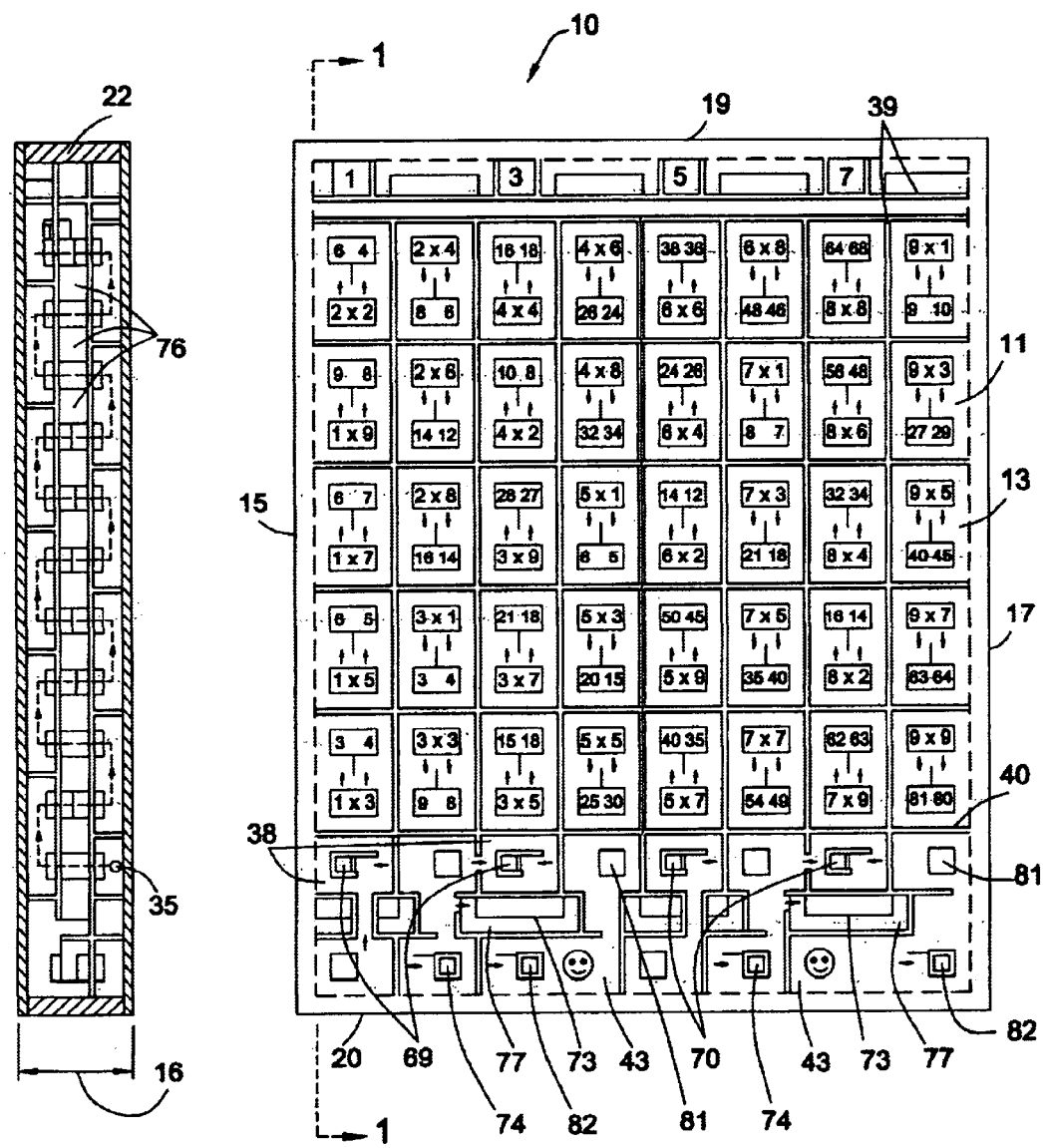
FIG. 1 is the front view of the instructional device.
FIG. 1A is a cross sectional view taken along 1—1 of FIG. 1.
Figure 2:
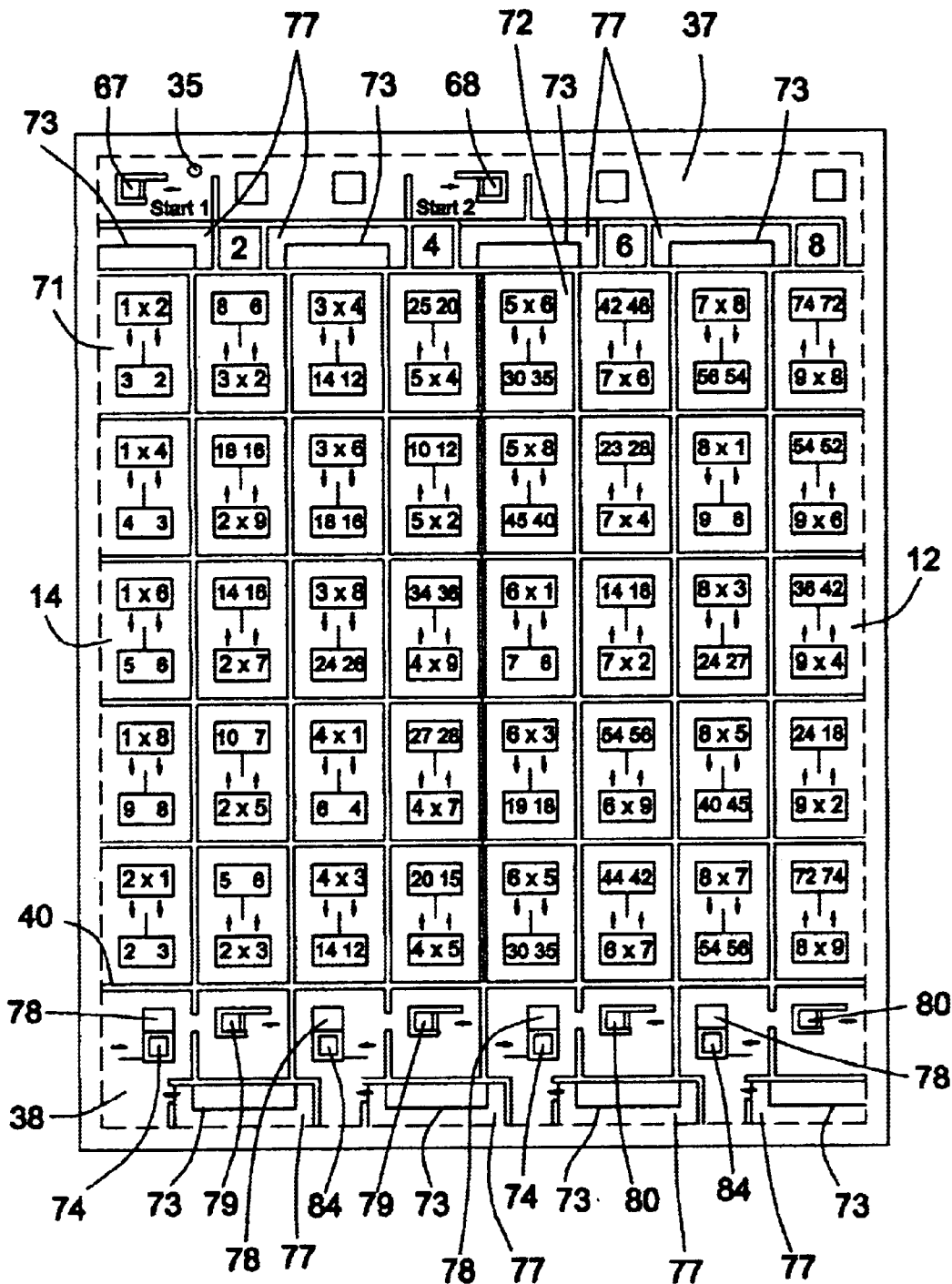
FIG. 2 is the back view of the instructional device.

FIG. 1 shows an example of a front view of the device while FIG. 2 shows an example of a back or rear view of the instructional device 10 as seen from the outside using a multiplication problem ranging from 1×2 to 9×9. Although FIG. 1 herein shows the front view and FIG. 2 shows the back view, a user can start at either side or reverse the designation of FIG. 2 with FIG. 1. Also, the mathematical problems presented in FIG. 1 can just as well be in FIG. 2 and those in FIG. 2 can be at FIG. 1. The layout of the multiplication problems on the front section 11 of the device covers a different set of problems from that covered by the back section 12. In the example shown in FIG. 1, there are 40 multiplication problems with 80 answers with the back section shown in FIG. 2 having another 40 problems with 80 answers. The number of problems presented on each side can vary according to the desire of the manufacturer or the nature of the facts to be memorized. In the claimed invention, both the front and the back sections have the questions and the answers.

The instructional device 10 is preferably configured in the shape of a square or a rectangle, however, other geometrical shapes are usable so long as the coordination of the holes, enclosures and respective pathways associated with the correct and wrong answers are maintained. The instructional device 10 has a front section 11 having a front face 13 and a back section 12 having a back face 14. The device as shown in FIGS. 1 and 1A is bordered on the sides by a first peripheral edge 15 which extends from the front face to the back face forming a first lateral wall with a height 16; a second peripheral edge 17 opposite the first peripheral edge 15 also extending from the front 13 to the back 14 face forming a second lateral wall 18 with the same height 16; a third peripheral edge 19 bordering the top of the device 10 which is perpendicular in position to the first 15 and second 17 peripheral edges and also extending from the front to the back face forming a top horizontal wall with the same height 16; and, a fourth peripheral edge 20 bordering the bottom of the device 10, parallel in position to the third peripheral edge 19 also extending from the front to the back face forming a bottom horizontal wall 21 with the same height 16 as the other three side walls described above. These side walls together with the front and back faces form a hollow casing 22 to accommodate and enclose the internal components of the device which snugly fits inside the casing 22. Snugly means that the edges of the internal components touch on the internal surface of the side walls of the casing and the tips of the structures protruding from the top surfaces touch on the respective front or back face of the casing. The device is preferably made of a rigid plastic material to make it inexpensive to manufacture. Glass may hurt the user once it breaks or cracks. The front and back face of the casing should be transparent to be able to use the device as explained later. The thickness 16 of the walls is at the discretion of the manufacturer, taking into consideration the thickness of the internal components, the desired durability and the final weight of the device. For children under 7 years old, the side walls or edges of the device may be fully enveloped or partially enveloped at the corners, if shaped as a rectangle or square, or at other sharp edges with a nonabrasive material such as foam or rubber like material which can be replaced or removed when the child gets older. The device may incorporate a handle for the user to grasp or grip on while manipulating the device 10. This is advisable especially for the physically challenged users. The handles preferably extend from each lateral wall or if shaped differently, from opposite sides of the device.

Figure 3:
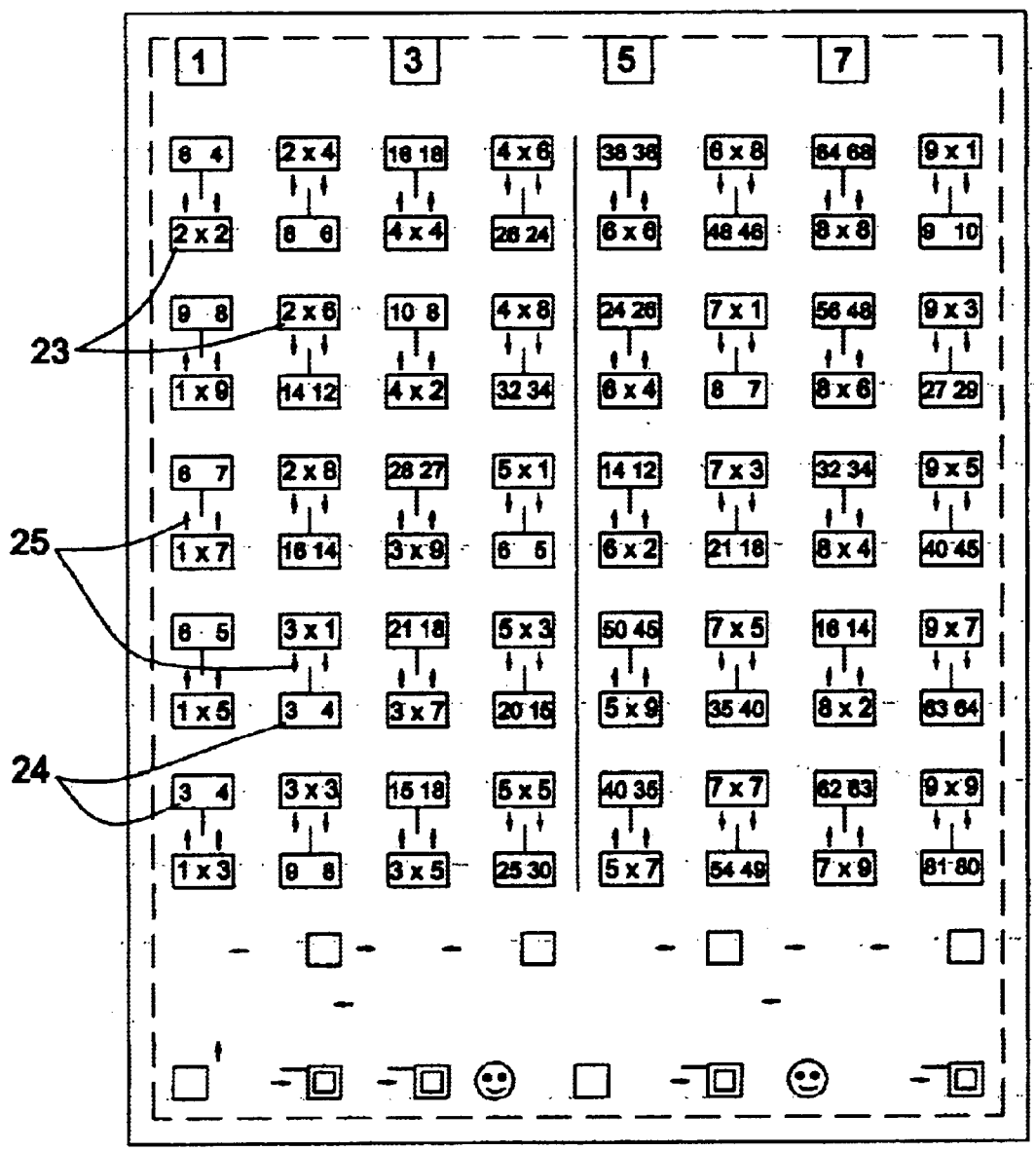
FIG. 3 is the printed graphics on the underside of the front face.
Figure 4:
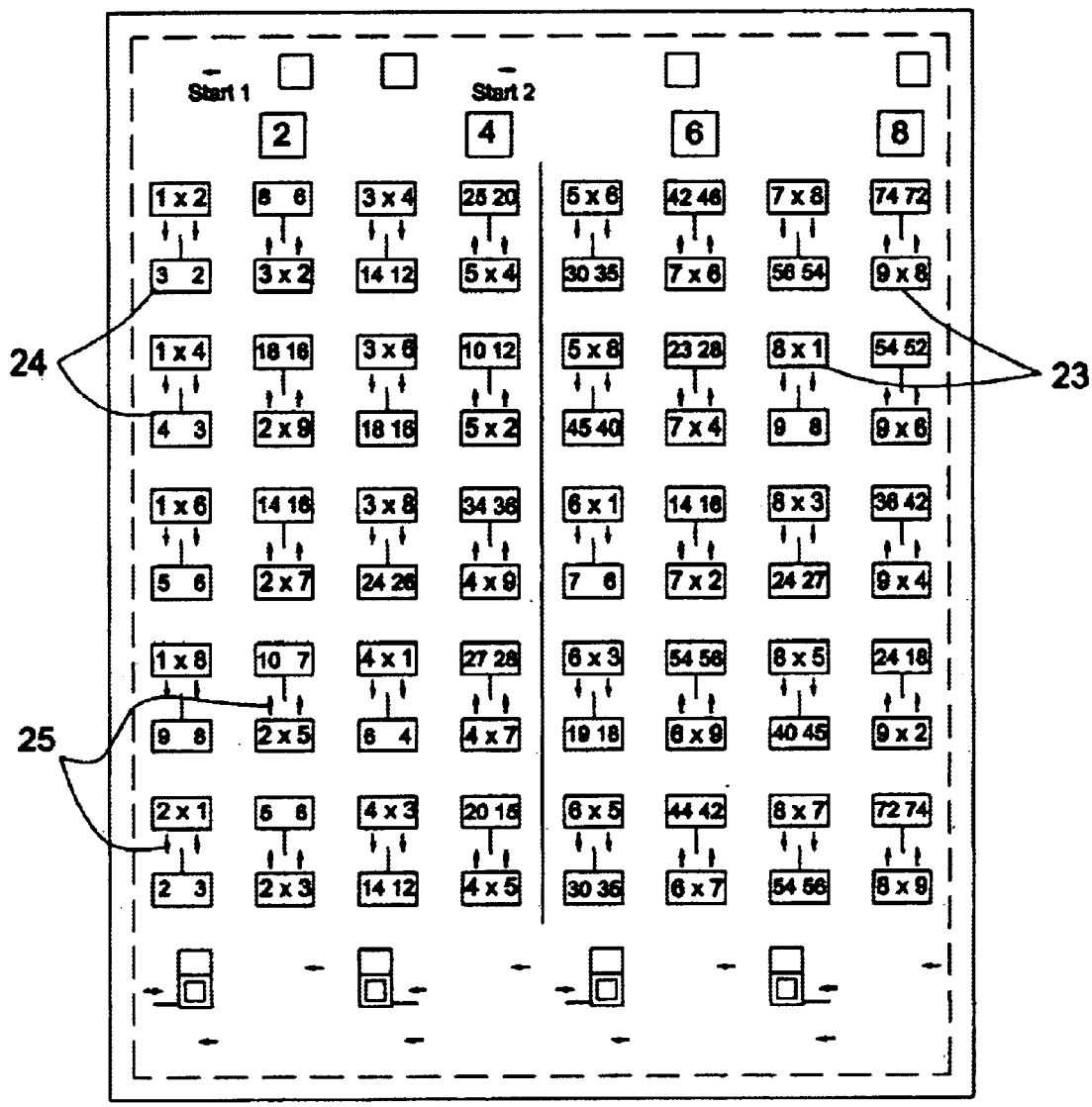
FIG. 4 is the printed graphics on the underside of the back face.

FIGS. 3 and 4 shows the printed graphics at the underside of the front face 13 and back face 14 readable from the outside. In using the device, one goes from FIG. 1 to FIG. 2, from the front section of FIG. 1 to the front section of FIG. 2 by flipping over the device along the axis of the horizontal walls (referred herein as the horizontal axis). As shown in this example, the printed graphics are a series of mathematical questions or problems 23 (herein used interchangeably) and solutions or answers 24 with arrows 25 linking the problems to the answers. These arrows as well as other arrows imprinted direct the pathways of an object. The object is the tool used in operating the device. In this example, the printed numbers: 1, 2, 3, 4, 5, 6, 7 and 8, alternating between the front and the back face correspond to the columns or rows of problems. The number of rows or columns is not fixed but depends on the number of problems and answers presented and the desired size of the instructional device. It is also preferable to incorporate other printed symbols to guide the user such as symbols where the object can not enter or enter. Different colors or shadings can also be used to differentiate the problems from the answers and to differentiate the functions of the arrows.

Figure 5:
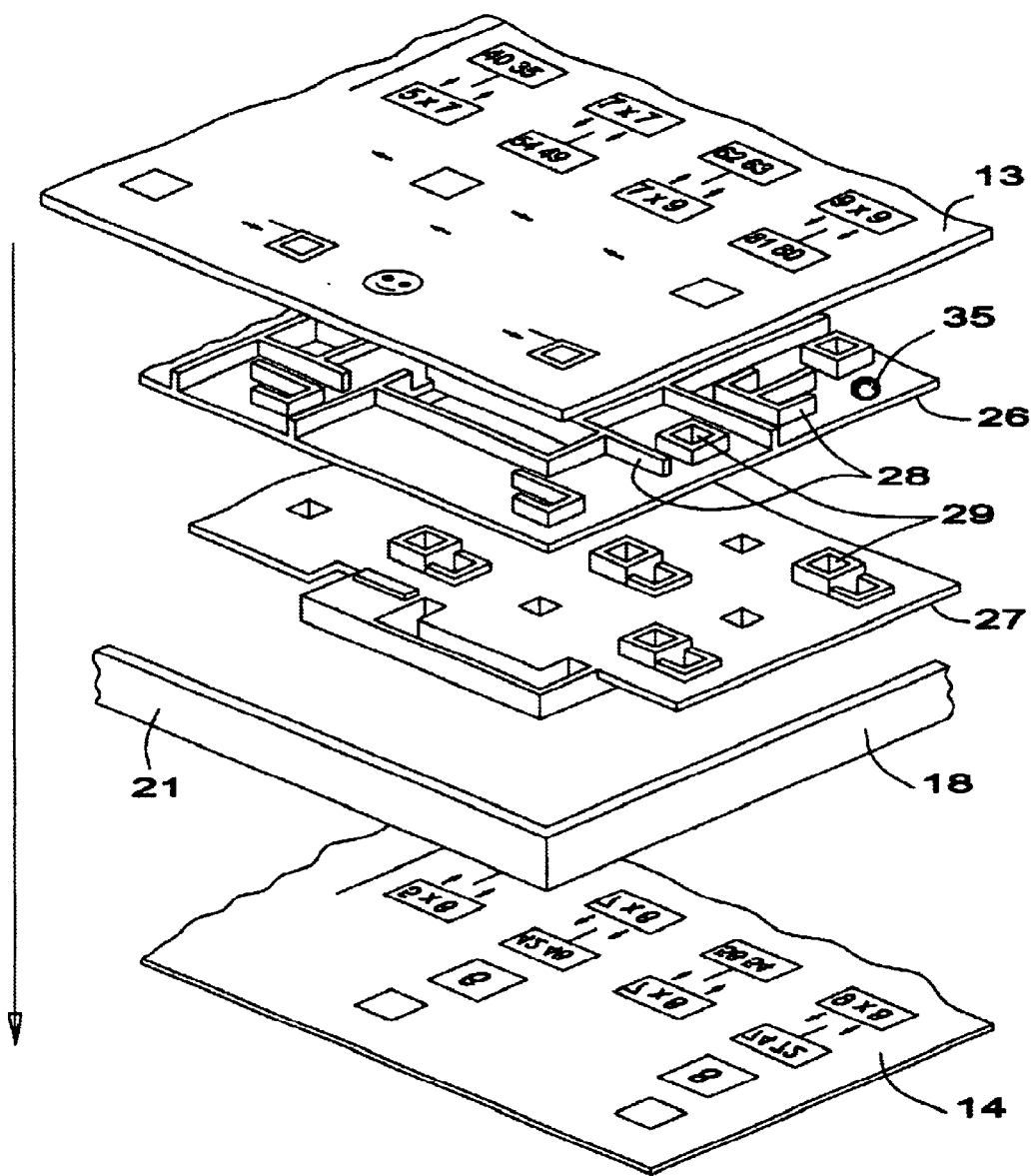
FIG. 5 is an exploded perspective partial view of the right lower corner of the instructional device.
Figures 6, 6A:
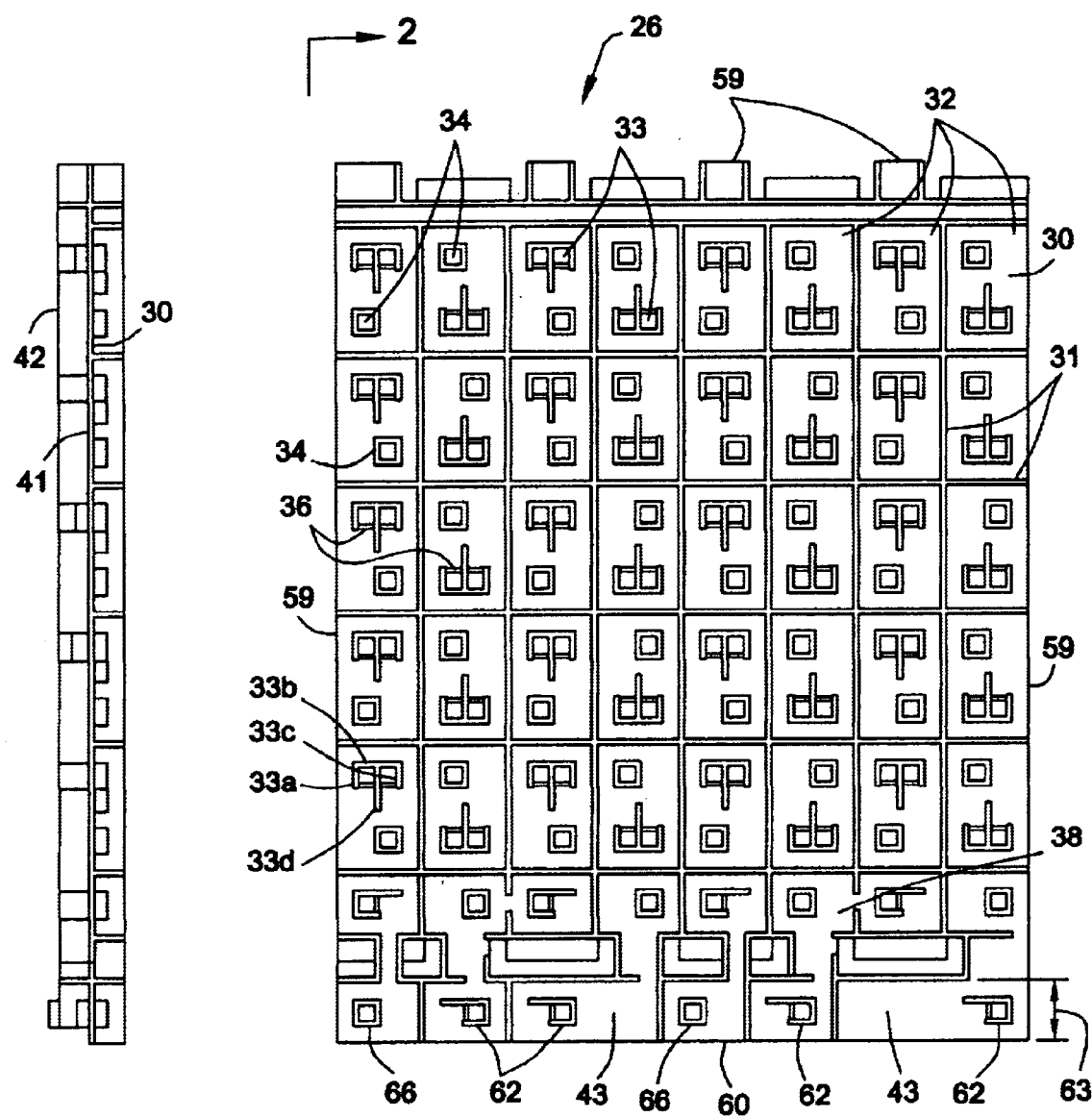
FIG. 6 is a plan view of the first central insert component.
FIG. 6A is a side view of the first central insert component taken along 2—2.
Figures 7, 7A:
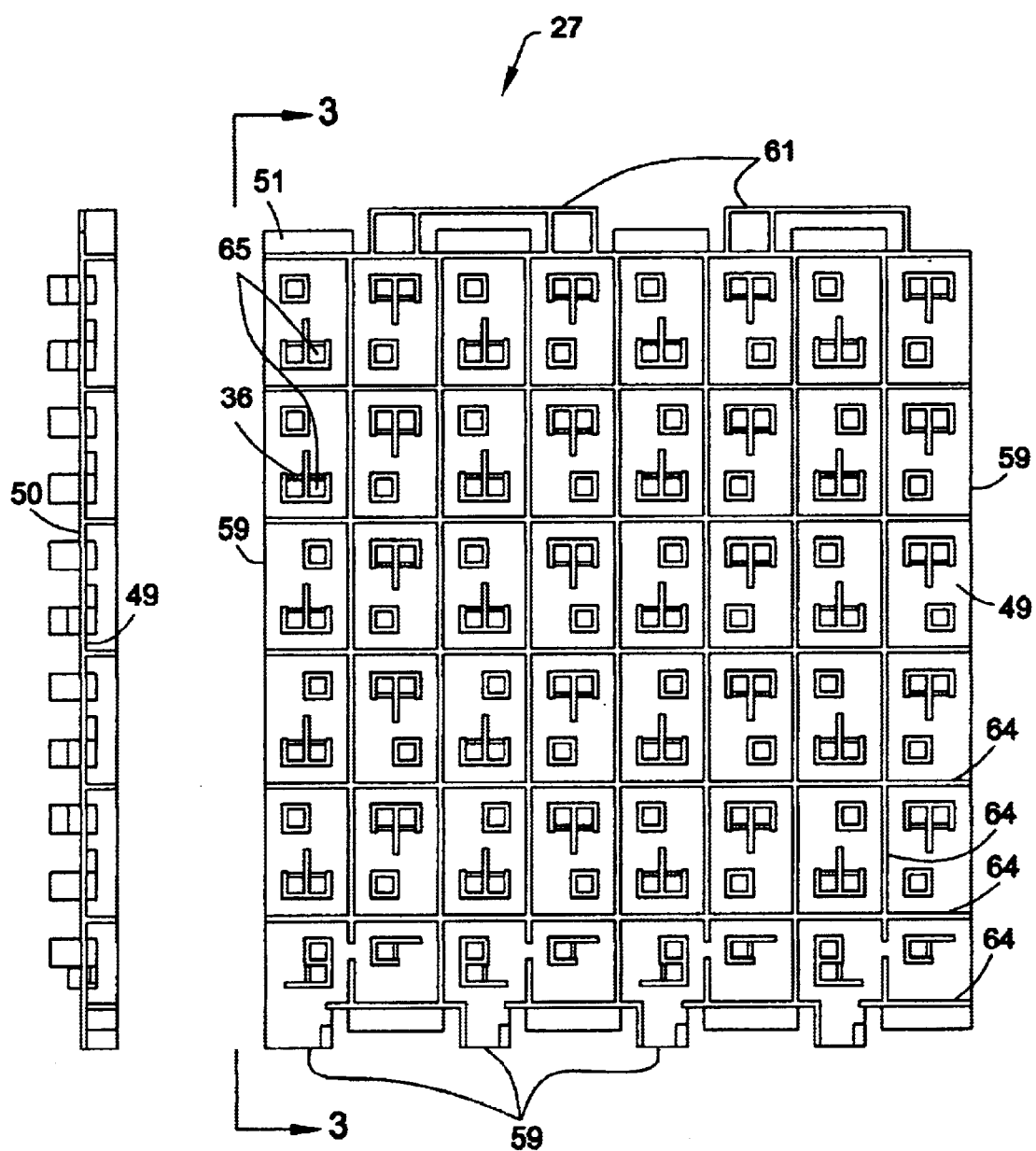
FIG. 7 is a plan view of the second central insert component.
FIG. 7A is a side view of the second central insert component taken along 3—3.

Sandwiched between the front face 13 and the back face 14 and contained within the casing 22 are the internal components comprising a first central insert component 26 and a second central insert component 27 as partially shown by FIG. 5 having its respective combination of walled and plain holes or openings 29 (herein used interchangeably) and mazelike protruding fences 28 directed either downwards or upwards from the respective surfaces of the components. These fences protrude upwards from the top surface and downwards from the bottom surface. FIG. 6 shows the plan view of the first central insert component 26 looking from the direction shown by the arrow on FIG. 5 while FIG. 7 shows the plan view of the second central insert component 27 as seen after flipping over the device along the horizontal axis. FIG. 6A is the side view of the first central insert component 26 showing the top and bottom surface while FIG. 7A is the side view of the second insert component 27 showing the top and bottom surface.

Figure 8:
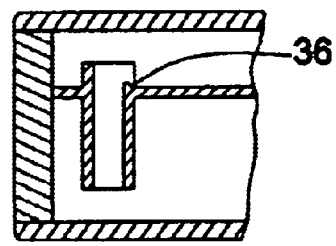
FIG. 8 is partial cross sectional view of the passageway into an opening having a ramp to facilitate but deter inadvertent entry of an object.
Figure 8A:
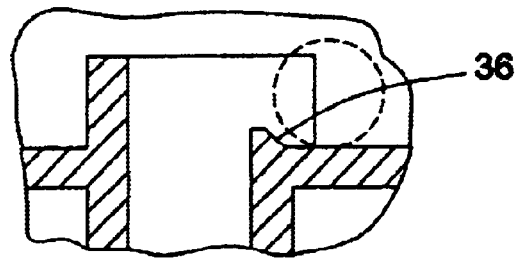
FIG. 8A is a magnified view of the ramp shown in FIG. 8.

The first central insert component 26, hereinafter first insert, is positioned beneath the front face 13. The first insert 26 as shown in FIG. 6 has on its top surface 30, protruding fences 31 (protrusion shown in FIG. 5) defining a plurality of individual cells or enclosures 32 (herein used interchangeably), each cell bordering a pair of question 23 and answers 24. A double opening 33 preferably adjacent to each other sits directly underneath the answers 24 while the single hole 34 is an opening where an object 35 such as a ball can enter into a particular cell or designated area within the device. The height of the protruding fences 31 is taller than the height of the three walls 33a, 33b, 33c and 33d around the double holes or openings 33 and is also taller than the height of the walls around the single openings 34 to keep the object within the respective cell 32 even if the device is turned upside down because the tip of these fences 31 touch on the front face. These fences also disallow the object to enter the cells other than from holes 34. The walls around the openings, in turn, keep the object 35 within the respective areas of the openings. Each entry into the double opening 33 has a ramp 36 as shown in FIGS. 6, 8 and 8A to facilitate the entry but requite slight tilting and maneuvering of the object, herein a ball 35 before entering into the chosen hole of the double holes 33. As shown in FIGS. 1 and 2, the reset 37, column entry 38 and the finish point 43 areas are separated from the cells also by protruding fences 39 and 40, of the same height as those bordering the cells. The column entry area 38 and the finish point area 43 as shown in FIGS. 1 and 6 show the respective patterns of fences and holes for directing the pathway of the ball 35 once it reaches the area. The fences and walls protruding upwards from the top surface define the external enclosures and pathways for the object. In general, the tip of the protruding fences defining the cells and separating the column entry areas, reset areas and finish point areas touch on the face of the casing. This prevent inadvertent entry of the object and also prevent cheating because the object can not enter the cell or area other than from the designated pathways.

Figure 9:
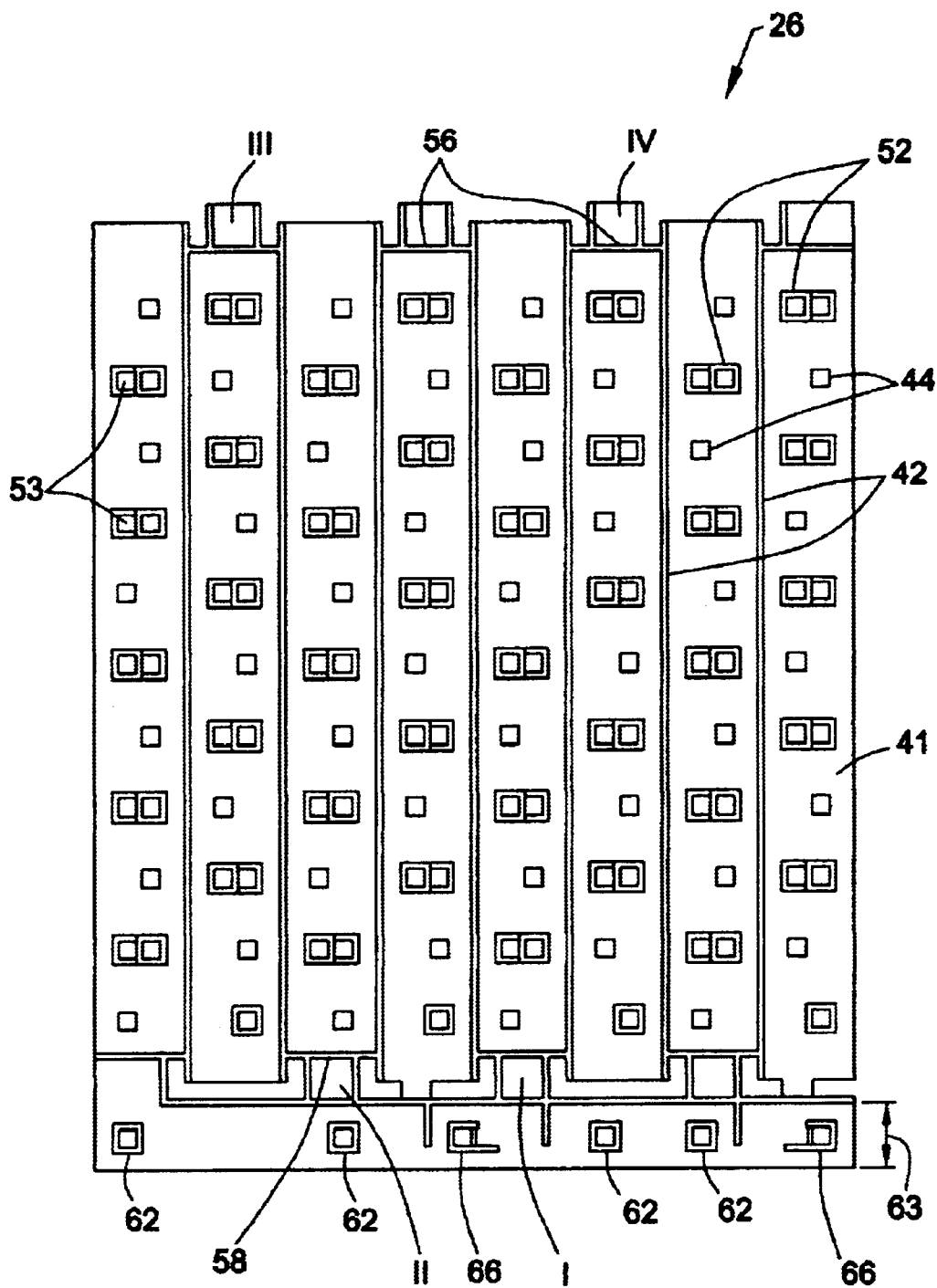
FIG. 9 is a plan view of the bottom surface of the first central insert component.
Figure 10:
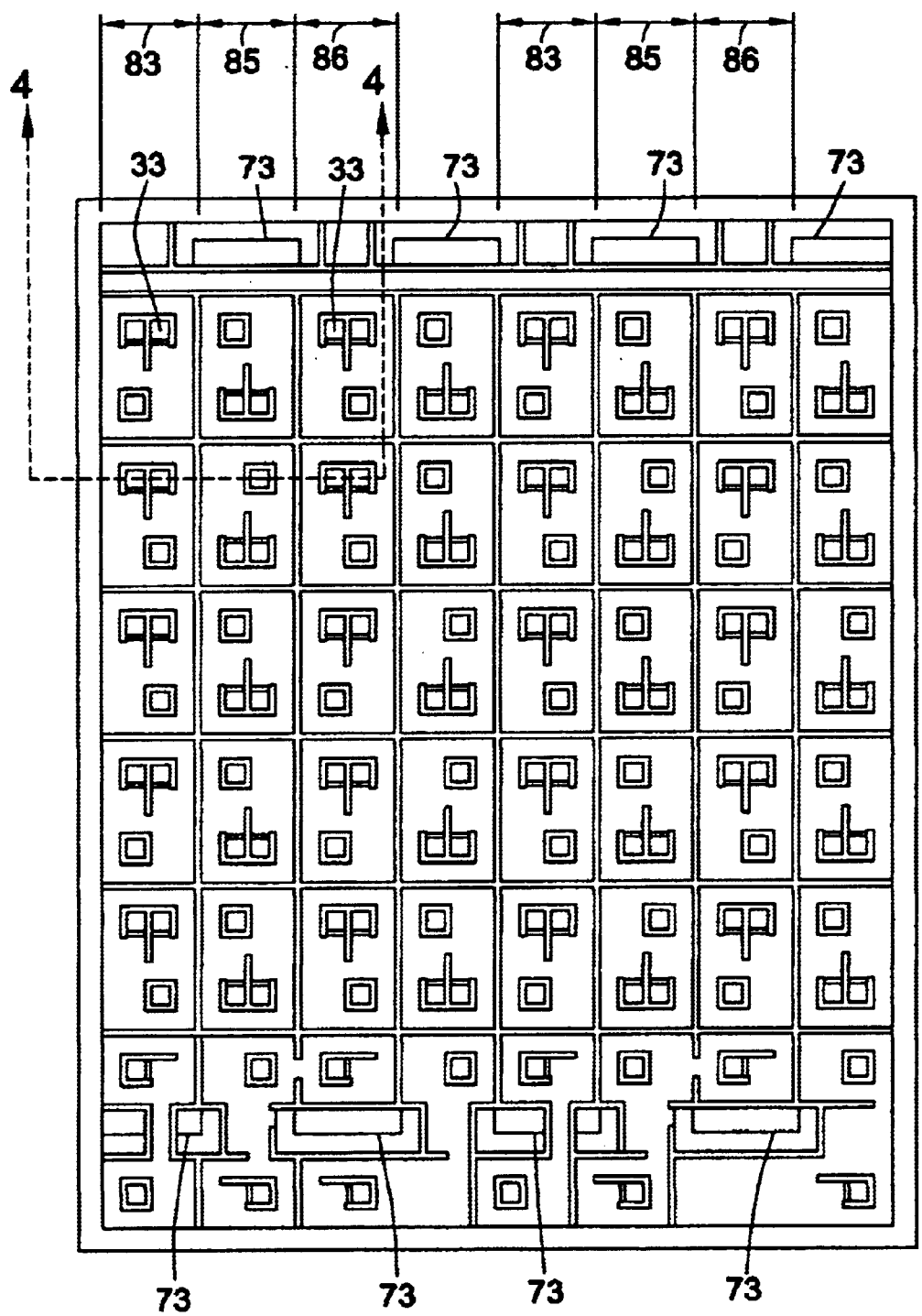
FIG. 10 is a front view of the device having the first and the second central insert components stacked together inside a casing with the top surface of the first central insert component exposed in the absence of the front face.

The bottom surface 41 of the first insert 26 is shown in FIG. 6A and 9. To correlate the top surface 30 shown in FIG. 6 with the bottom surface 41 shown in FIG. 9, the top left corner cell shown in FIG. 6 has its corresponding bottom on the top right corner of FIG. 9. FIG. 9 shows the plan view of the bottom surface 41 when the top surface 30 is flipped on the side along the axis of the lateral walls, referred to herein as vertical axis, in the same direction as one flips a page of a book. The bottom surface 41 comprises longitudinal fences 42 protruding downwards to separate the columns. These fences have a height the same as the walls surrounding the opening 52 represented by a four double walled opening but taller than the three double walled opening 53. The single openings 44 at the bottom surface are plain having no walls around them. The fences separating the reset 37, column entry 38 and finish point 43 areas are also of the same height as the protruding fences 42.

As shown in FIGS. 6, 6A, 10 and 10A, the double holes 33 located directly underneath the answers 24 on each cell 32, have protruding passageways of different depth. The hole or opening 45 for the correct answer has a corresponding passageway 46 that is longer than the passageway 47 of the opening 48 for the incorrect or wrong answer (herein used interchangeably). Passageway 46 is longer because it has to reach into the opening 34 of the opposite cell located on the upper or top surface 49 of the second central insert component 27, also referred to as second insert.

Figure 11:
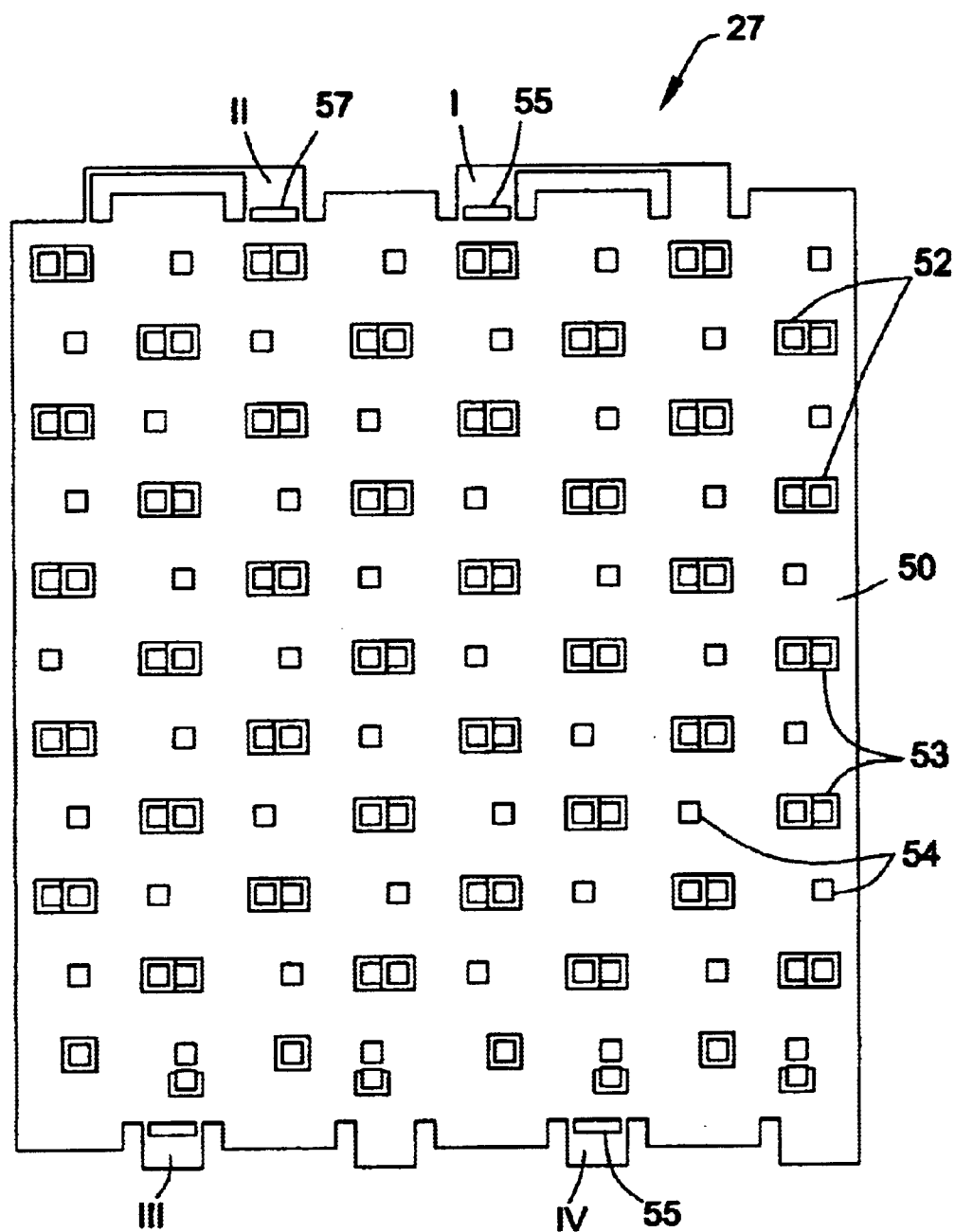
FIG. 11 is a plan view of the bottom surface of the second central insert component.

The second insert 27 is preferably stacked underneath the first insert 26 before it is inserted to the casing 22. In orientation, the bottom surface 50 of the second insert 27 stacks and communicates directly with the bottom surface 41 of the first insert 26. The top surface 49 is the surface facing the back face 14 of the casing 22. FIG. 11 shows the bottom surface 50 of the second insert. To correlate the top 49 with the bottom 50, the top left corner cell 51 of the top surface 49 shown in FIG. 7 has its corresponding bottom shown at the top right corner of FIG. 11. As in the first insert, FIG. 11 shows the plan view of the bottom surface when the top surface is flipped along the vertical axis.

Looking straight at FIGS. 9 and 11, for the bottom surfaces 41 and 50 of the first and second insert, the openings 52 represented by a 4 double walled full square opening or simply, four double walled opening has a protruding wall having a height taller than the protruding wall of the opening 53 represented by a three double walled opening connecting to and sharing a common wall of the full square opening 52. To aid in visualization, the height of the protruding wall of the opening 52 in relation to the height of opening 53 correspond to the difference in length or depth of passageway 46 and 47 shown in FIG. 10A. The single plain openings 54, as in openings 44 of the first insert, have no walls around them. The representation explained here regarding the four double walled opening, the three double walled opening and the plain opening applies only to the bottom surfaces of the first and second insert. These representation and its corresponding description should be the one used to construct the internal enclosures and pathways which are formed by the stacking of the respective bottom surfaces. The protruding walls of opening 52 correspond to the longer passageway 46 of opening 45. This passageway should terminate at a plain opening 54 leading to the top surface of the second insert 27. This is the pathway used for the correct answer. An object entering opening 52 of one insert component will proceed to the plain opening leading to another cell of the other insert component. The opening 53 correspond to opening 48 having the shorter passageway 47. This passageway terminates at a middle compartment formed between the first and second insert after stacking their respective bottom surfaces. This is the pathway used for the wrong answer. An object entering 53 will fall into the middle compartment, incapable of returning into a cell, and proceeds to a wrong answer area where the object can be directed to a reset area to restart the operation or to a column entry area to repeat answering the column of cells of question and answers. This relationship and matching of the holes and passageways applies to all the other holes or openings of the respective bottom surfaces more specifically represented by 52, 53, 44 and 54. The longitudinal fences 42 protruding from the bottom surface 41 keep the object within the column of cells as it traverse the middle compartment to the wrong answer exit. The height of the fences and walls of the top surfaces 30 and 49 does not impact the internal pathway of the object. These fences and walls on the top surfaces defines the enclosures and external pathways of the object once it enters any of the top surface openings.

Aside from the manner of matching or stacking the openings and pathways of the bottom surface to each other, on the areas designated as I, II, III, and IV of FIG. 11 are protruding bars 55, preferably rectangular or square. These bars, at least one on top and one at the bottom, are used as a guide to ensure that the second insert stacks in the right position underneath the first insert. These bars should lodge against the walls 56 shown in FIG. 9. The matching areas are designated correspondingly. For example, the bar 57 shown on FIG. 11 should lodge against the wall 58 shown on FIG. 9. When the inserts stack together, the cells on the top surface 30 of the first insert does not directly lay on top of the cells of the second insert but are offset to allow the ball to advance from one cell on the first insert to another cell on the second insert in a sinuous pattern shown in FIG. 1A.

Three of the side edges 59 of the first and second insert are coterminal to each other and touches the inside surface of the casing. However, one edge 60 of the first insert shown in FIG. 6 extends farther than the edge 61 of the second insert shown in FIG. 7 so as not to block the series of holes or openings 62 located at the extended section 63 of the first insert. The edge of this extended section touch on the inside surface of the side wall of the casing that correspond to this section. The extended section 63 of the first insert 26 does not have a corresponding section on the second insert 27 thereby exposing the top and bottom surface of the series of holes 62 which are reset holes and start holes 66 leading to a column entry opening. These openings provide alternate route or pathways for resetting or restarting the device other than purposely directing the object to the middle compartment by choosing a wrong answer. The bottom surface of these series of holes is shown in FIG. 9. The relative heights of these openings do not follow the representation for the bottom surfaces 41 and 50 described in paragraph [0042 and 0044]. Here, the height of the holes 62 is taller than those of holes 66 because the object 35 should be able to enter 66 but not 62. In general, all the openings whether it is on the top or bottom surface, where the object or ball should not enter, are fully surrounded with protruding walls to prevent it from doing so. The opening 66 also has a ramp 36 at the entry for the ball. Some openings herein may be identified by more than one number. This may be due to one number given as a generic number to identify all similar openings and another a specific number for the particular opening or the numbers used to describe the device may be different from the numbers used to describe the method of operation.

FIG. 7 shows the top surface 49 of the second insert 27 facing the back face 14. In orientation, the left top corner shown on FIG. 7 correspond to the cell having a problem 1×2. As in FIG. 6, the fences 64 separating the cells, reset area, column entry and finish point area are raised higher (looking directly on the top surface), that is, taller than the walls surrounding the double and single holes and the tip of these fences touch the back face to keep the object from escaping the area where it is on. As in FIG. 6, the double holes 65 are directly positioned underneath the two answers 24 and the single holes are where the ball 35 enters into the cell. Each entry holes into the double opening 65, as described for the first insert, has a ramp 36 to facilitate but deter the inadvertent entry of the object. Similar to the top surface of the first insert, these fences and openings provide the external enclosures and pathways for the object when it is at the top surface of the second insert 27.

As stated, the object used in this example device is a ball 35 contained inside the casing for its operation. This prevents the user from losing the ball as well as avoiding the necessity of bringing a detached accessory which renders the device useless if not available or lost. The ball is preferably made of metal for better maneuverability into and through the fences 28 and holes 29 of the first and second central insert components. However, other materials such as plastic or glass can also be used. The rows of problems can be arranged in an ascending hierarchical pattern, that is from the easiest to the hardest or it can be scrambled or mixed. To use the device, one can start at the easiest problem and advance his or her way up into the more complex problems. If the device is sectionalized into levels such as beginner, intermediate, advanced, etc., the user has the option to start at the particular section desired. The example herein shows a device sectioned into two but this is discretionary. The device 10 can have only one section or more than one section as desired.

To explain the operation of the sample device as shown and constructed herein, one puts the ball 35 on the general reset area 37 shown in FIG. 2 and allows the ball 35 to enter either start hole 67 for the first section or start hole 68 for the next section and work his or her way through the problems which usually increases in complexity. When the ball 35 enters either start hole 67 or 68, it proceeds to the column entry area 38 where the ball is maneuvered to enter either entry hole 69 or 70 shown in FIG. 1. If the ball entered entry hole 69, the ball proceeds to cell 71 having the problem 1×2. If the ball entered entry hole 70, it will proceed to cell 72 having a problem 5×6. As mentioned above, the front and back faces should be made of transparent materials to enable the user to see where the ball is and direct its movement through the different holes and cells of the device. The user is prompted with the problem 23 and given two choices for the answer 24 as directed by the arrows 25, herein 2,3 on cell 71 or 30,35 on cell 72, however any wrong answer combined with the right answer can be used. Since there are two answers given, the user is challenged to choose the right answer. The level of challenge can be catered to the age and intelligence of the user. The user after making his or her mind, directs the ball to the chosen hole directly situated underneath the chosen answer. If the user chooses the right or correct answer, the ball 35 proceeds to the next cell which is on the side directly opposite cell 71 or 72. The next cell is off set by approximately half of the width of cell 71 or 72 to allow the ball to go from one cell to the other in a pattern shown in FIG. 1A so long as the answers given are correct. Since the cell is on the opposite side, the user should flip the device 10 over along the horizontal axis to continue to the next problem. The correct operation advances from one column to the other by the ball 35 entering the correct answer transfer hole 78 and proceeding to the entry holes 79 or 80 for the operation of the next column of problems. This operation is repeated so long as the user chooses the right answer. If a user chooses all the right answers in the example given here, the user has perfected his multiplication problem from 1×2 to 9×9 and reaches both finish point 43 areas of the two sections through the end exit hole 81. This area may be identified by a happy or congratulatory sign printed on the graphics of the front face. On the finish point area, there is a general reset hole 82 which directs the ball to the reset area 37 having the start hole for the user to start anew or another user to start operating the device 10.

Although it is recommended to start on the problems shown on FIG. 1, it is also possible to start on the problems shown on FIG. 2. If the user finds the ball located at a cell in the middle of the device 10, it is recommended to put the ball at the reset area 37 by purposely choosing a wrong or incorrect answer which directs the ball to the wrong answer exit 73 where the ball can be directed to the reset area 37 by going through the reset holes 74. Note that when the ball is at the middle cell of the first column 83 of each section, the ball is automatically directed to the reset area 37 when one purposely or erroneously chooses the wrong answer.

Figure 10A:
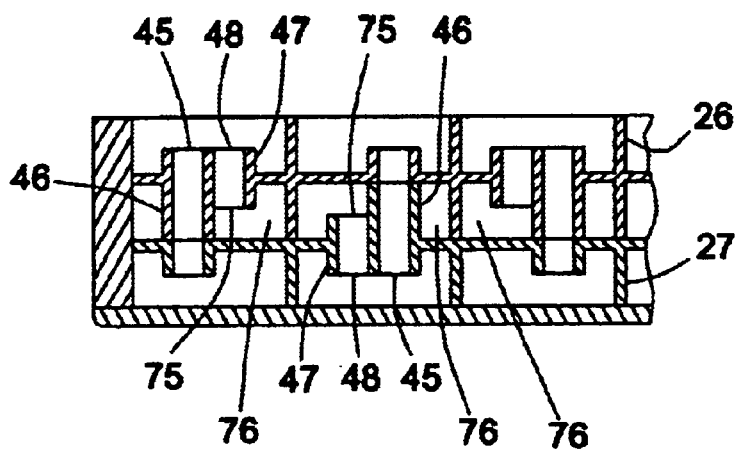
FIG. 10A is a partial cross sectional view of FIG. 10 taken along 4—4.

If the user chooses an incorrect answer for the problem on any cell, the ball 35 will enter the passageway 47 and exit through the opening 75 shown in FIG. 10A. Since this passageway is shorter, the ball does not reach into the opposite cell but lodges into the middle compartment 76 of the device located between the first 26 and the second 27 central insert component and exit to the wrong answer area 77 through the wrong answer exit 73. At this point, the user can restart the operation by directing the ball to the reset hole 74 or go to the column entry area 38 of the respective column that the user made a mistake on to repeat the same column by entering the respective column's entry hole 69 or 70. In going to the wrong answer exit hole 73, the ball merely travels through the unimpeded open areas of the middle compartment 76. When a user chooses an incorrect answer from a problem cell located on the back face shown in FIG. 2, the direction of the ball is similar, the ball will enter the passageway 47 and exit through the opening 75. Since this passageway is shorter, the ball does not reach into the opposite cell but lodges into the middle compartment 76 of the device located between the first 26 and the second 27 central insert component and exit to the wrong answer area 77 through the wrong answer exit 73. Once the ball enters the wrong answer area 77 shown on FIG. 2, the ball automatically goes to the wrong answer area 77 shown on FIG. 1 At this point as in the above, the user can restart the operation by directing the ball to the reset hole 74 or go to the column entry area 38 of the respective column that the user made a mistake on to repeat the same column by entering the respective column's entry hole 69 or 70. Note that when the ball enters the wrong answer area 77 on FIG. 1, it stays there, that is, it does not go to the wrong answer area 77 on FIG. 2 but proceeds as directed either to the reset hole or to the column entry area as described above.

The path of the ball 35 on the first column 83 of each section is slightly different from the second and third column. The pathway for the second 85 and third column 86 repeats until the finish point is reached. When the ball is placed on the start hole 67, the ball enters the column entry area shown in FIG. 1 where the ball is directed to the entry hole 69 by means of printed arrows on the face of the device. After the ball enters 69, the ball enters the first cell of question and answer. If the answers are correct, the ball proceeds as explained above. At the end of the first complete column, the ball enters the correct answer transfer hole 78 and enters the column entry area 38. After this operation, the user is given the option to restart by directing the ball to the reset hole 74 or proceed to the next column by entering the entry hole for the next column, which in this example is 79. After it enters 79, the ball goes to the first cell of problem in column two. The ball advances as described above. If all the answers are correct for column two, that is, a user successfully completing column two, after the ball enters the reset area 38, the user is again given the option to restart or proceed to the next column of problems. When the user successfully answers or successfully completes all the questions in column three, the user can either go to the next column or enter the column reset hole 84 which allows the user to repeat the same problems on the third column. Not all columns allow one to repeat the same column at the end of a successfully completed column such as column two herein. The pathway for the second column and the third column is repeated until the user successfully reaches the finish point. When the ball is at the finish point area, the game can be restarted by letting the ball enter the general reset hole 82.

In every instance, a user can quit the operation by purposely choosing the wrong answer which brings the ball to the wrong answer area 77 and from there direct the ball as desired or direct the ball to one of the reset holes at the extended section 63 of the first insert 26.

Figure 12:
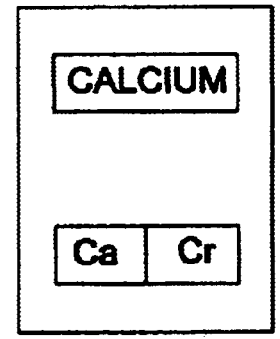

The device can tackle other types of problems. For example, it can be used to help memorize the symbols of the elements. A sample of how a cell would look is shown in FIG. 12.

This device 10 not only assist a user in remembering facts but the device also aids in improving a user's manual coordination as well as enhance patience, perseverance and concentration.

While the embodiment of the present invention has been described, it should be understood that various changes, modifications and adaptations may be made therein without departing from the spirit of the invention and the scope of the appended claims. Those skilled in the art will recognize that other and further variations of the features presented herein are possible. The scope of the present invention should be determined by the teachings disclosed herein, the appended claims and their legal equivalents.

We claim:

1. An instructional device, comprising,
    a casing bordered by side walls, a front face and a back face, the casing snugly enclosing a first central insert component and a second central insert component each having a combination of protruding fences, walled openings, plain openings on a top and bottom surfaces, the first central insert component and the second central insert component stacked together, the bottom surfaces of each central insert component communicating directly with each other forming a series of internal enclosures and pathways, each top surface of the central insert components forming a series of external enclosures and pathways, the coordination of the internal and external enclosures and pathways resulting from the communication and matching of the protruding fences, walled openings and plain openings, the pathways permitting passage of an object therethrough;
    a series of questions and answers imprinted on each face, each pair of question and answer contained in a cell, each answer having an opening leading to a definite pathway;
    means for starting an operation using the device;
    means for resetting the device to a start position;
    means for directing the object to a reset area when an incorrect answer is chosen;
    means for directing the object to another cell or a finish area when a correct answer is chosen;
    means for repeating the operation of a column of cells of question and answers without restarting the operation;
    means for ensuring the correct stacking of the first central insert component with the second central insert component; and,
    means for preventing entry of the object at openings not designated for entry.

2. The device of claim 1 further comprising nonabrasive material fully or partially enveloping the side walls or sharp edges of the device.

3. The device of claim 1 further comprising handles for operating the device.

4. The device of claim 1 wherein the device is made of a rigid plastic material having a transparent front and back faces except for sections covered by imprinted graphics.

5. The device of claim 1 further comprising printed arrows on the front and back faces directing the pathways for the object.

6. The device of claim 1 wherein the fences protrude upwards from the top surface and downwards from the bottom surface of the first and second central insert components.

7. The device of claim 1 wherein a double opening sits directly underneath the answers, the double opening leading to passageways of different depths, the depth underneath a correct answer longer than the depth underneath a wrong answer to reach another cell, the passageway for the wrong answer terminating in a middle compartment between the first and second central insert component leading to a wrong answer exit without reaching another cell.

8. The device of claim 1 wherein the cells of question and answers are arranged in a column, the bottom surface of the first central insert component having longitudinal fences protruding downwards to keep the object within the column of cells as it traverse a middle compartment formed after stacking the first and second insert component.

9. The device of claim 1 wherein the protruding fences defining cells and separating areas of the device have tips touching on the face of the device, the protruding fences defining the cells preventing the object to leave or enter the cell without entering an opening.

10. The device of claim 1 further comprising a ramp on an entry facilitating the passage of the object.

11. The device of claim 1 wherein the means for ensuring the correct stacking of the first central insert component with the second central insert component are aided by protruding bars lodging against a wall or a specific opening.

12. The device of claim 1 wherein cells on the top surface of the first central insert component are offset from the cells on the top surface of the second central insert component when the first and second central insert components are stacked together.

13. The device of claim 1 wherein the first and second central insert components have three of the side edges coterminal to each other, the coterminal edges touching an inside surface of the casing.

14. The device of claim 13 wherein one central insert component has an extended section on one edge opposite a coterminal edge exposing on the extended section a series of reset and column entry holes, the edge of the extended section touching the inside surface of the casing.

15. The device of claim 1 wherein the means for preventing entry of the object at openings not designated for entry are protruding walls surrounding the openings.

16. The device of claim 1 wherein the device can be sectionalized into different levels of complexity.

17. The device of claim 1 wherein the object is a ball contained inside the casing.

18. A method for operating a device comprising a series of questions and answers having an opening and corresponding pathways for each answer, individual pathways for starting, resetting, repeating and ending the operation, each pathway formed by a combination of protruding fences, walled openings and plain openings on a top and bottom surface of a first and second central insert components stacked in a definite position and enclosed in a casing, the pathways permitting passage of an object therethrough, comprising the steps of:

a. starting an operation by placing an object at a reset area and allowing the object to enter a start hole, the start hole directing the object to an entry area;

b. directing the object to enter a hole leading to a cell having a pair of question and answers;

c. answering the question by choosing between a correct answer and a wrong answer and directing the object to a hole directly underneath the chosen answer, each answer leading the object to a definite pathway;

d. proceeding to another cell if the correct answer is chosen, the object lodging at the other cell;

e. repeating step (d) to an end of a column of cells or proceeding to another column of cells to an end of the operation if all the answers chosen are correct;

f. restarting the operation of a completed column, the object directed to a column reset hole;

g. restarting the operation at the end of the operation, the object directed to the start hole of the reset area;

h. restarting a new operation or the column of cells when a wrong answer is chosen, the object exiting to a wrong answer area and proceeding to a reset hole to start the new operation or to a column entry area to repeat the same column of cells where the wrong answer was chosen, and, i. quitting at any step of the operation.

19. The method of claim 18 wherein proceeding to another cell is done by flipping the device to follow the object proceeding from one cell located at the top surface of one central insert component to another cell at the top surface of the other central insert component.

20. The method of claim 18 wherein the object can be made to enter a reset area at any time by purposely choosing a wrong answer.

21. The method of claim 18 wherein the option of repeating a successfully completed column is allowed only at the end of certain columns of cells.

* * * * *